United States Patent
Waddington (10) Patent No.: US 9,413,947 B2
(45) Date of Patent: Aug. 9, 2016

(54) CAPTURING IMAGES OF ACTIVE SUBJECTS ACCORDING TO ACTIVITY PROFILES

(71) Applicant: GOOGLE TECHNOLOGY HOLDINGS LLC, Mountain View, CA (US)

(72) Inventor: Alex Vaz Waddington, San Jose, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/448,199

(22) Filed: Jul. 31, 2014

(65) Prior Publication Data

US 2016/0037055 A1 Feb. 4, 2016

(51) Int. Cl.
*H04N 5/228* (2006.01)
*H04N 5/232* (2006.01)

(52) U.S. Cl.
CPC .................. *H04N 5/23216* (2013.01)

(58) Field of Classification Search
CPC .................................................. H04N 5/2316
See application file for complete search history.

(56) References Cited

U.S. PATENT DOCUMENTS

| | | | |
|---|---|---|---|
| 4,881,127 A | 11/1989 | Isoguchi et al. | |
| 5,294,990 A | 3/1994 | Aoki et al. | |
| 5,505,199 A * | 4/1996 | Kim | A61B 5/11 348/143 |
| 5,909,246 A | 6/1999 | Terashima | |
| 6,167,356 A | 12/2000 | Squadron et al. | |
| 6,347,925 B1 | 2/2002 | Woodard et al. | |
| 6,529,253 B1 | 3/2003 | Matsute | |
| 6,614,471 B1 | 9/2003 | Ott | |
| 7,190,263 B2 | 3/2007 | McKay et al. | |
| 7,301,563 B1 | 11/2007 | Kakinuma et al. | |
| 7,414,665 B2 | 8/2008 | Watanabe et al. | |
| 7,450,187 B2 | 11/2008 | Sun | |
| 8,295,631 B2 | 10/2012 | Adams et al. | |
| 8,619,128 B2 | 12/2013 | Bilbrey et al. | |
| 8,803,985 B2 | 8/2014 | Kaizu et al. | |
| 9,117,483 B2 | 8/2015 | Zaletel | |
| 9,143,749 B2 | 9/2015 | Wernersson | |

(Continued)

FOREIGN PATENT DOCUMENTS

| | | |
|---|---|---|
| EP | 2043360 | 4/2009 |
| EP | 2645700 | 3/2012 |

(Continued)

OTHER PUBLICATIONS

"Advisory Action", U.S. Appl. No. 11/931,828, May 30, 2014, 3 pages.

(Continued)

*Primary Examiner* — Gary C Vieaux
(74) *Attorney, Agent, or Firm* — Wolfe-SBMC (57) ABSTRACT

Techniques for capture of images of active subjects are described herein. In one or more implementations, a wearable device is configured to collect data regarding action of a subject associated with the wearable device during an activity. The wearable device then communicates with a user's mobile phone or other computing device to trigger image capture in accordance with trigger points defined for the activity. This may involve streaming collected data for processing by the capturing computing device to recognize the triggers and/or sending indications of trigger points that are recognized by the wearable device.

20 Claims, 7 Drawing Sheets

(56) References Cited

U.S. PATENT DOCUMENTS

| | | | |
|---|---|---|---|
| 9,344,639 B2 | 5/2016 | Musatenko et al. | |
| 9,357,127 B2 | 5/2016 | Lameer et al. | |
| 2002/0047909 A1 | 4/2002 | Hatae et al. | |
| 2002/0080263 A1 | 6/2002 | Krymski | |
| 2003/0007088 A1 | 1/2003 | Rantanen et al. | |
| 2003/0052989 A1 | 3/2003 | Bean et al. | |
| 2004/0107103 A1 | 6/2004 | Iyengar et al. | |
| 2005/0154318 A1 | 7/2005 | Sato | |
| 2005/0206820 A1 | 9/2005 | Palmer | |
| 2006/0156374 A1 | 7/2006 | Hu et al. | |
| 2007/0090283 A1 | 4/2007 | Linke et al. | |
| 2007/0115459 A1 | 5/2007 | Nakao et al. | |
| 2007/0201815 A1 | 8/2007 | Griffin | |
| 2007/0237423 A1 | 10/2007 | Tico et al. | |
| 2008/0077020 A1* | 3/2008 | Young | A61B 5/0205 600/484 |
| 2009/0086074 A1 | 4/2009 | Li et al. | |
| 2009/0087099 A1 | 4/2009 | Nakamura | |
| 2009/0109309 A1 | 4/2009 | He et al. | |
| 2009/0189992 A1 | 7/2009 | Zhang et al. | |
| 2009/0190803 A1 | 7/2009 | Neghina et al. | |
| 2009/0291707 A1 | 11/2009 | Choi | |
| 2010/0091119 A1 | 4/2010 | Lee | |
| 2010/0097491 A1 | 4/2010 | Farina et al. | |
| 2010/0149393 A1 | 6/2010 | Zarnowski et al. | |
| 2010/0195912 A1 | 8/2010 | Nakada et al. | |
| 2010/0208082 A1 | 8/2010 | Buchner et al. | |
| 2010/0271469 A1* | 10/2010 | She | G06K 9/00765 348/77 |
| 2010/0309333 A1 | 12/2010 | Smith et al. | |
| 2010/0309334 A1 | 12/2010 | James et al. | |
| 2010/0309335 A1 | 12/2010 | Brunner et al. | |
| 2011/0013807 A1 | 1/2011 | Lee et al. | |
| 2011/0043691 A1 | 2/2011 | Guitteny et al. | |
| 2011/0052136 A1 | 3/2011 | Homan et al. | |
| 2011/0069189 A1 | 3/2011 | Venkataraman et al. | |
| 2011/0122315 A1 | 5/2011 | Schweiger et al. | |
| 2011/0205433 A1 | 8/2011 | Altmann | |
| 2012/0081579 A1 | 4/2012 | Doepke | |
| 2012/0105584 A1 | 5/2012 | Gallagher et al. | |
| 2012/0314901 A1* | 12/2012 | Hanson | G08B 21/043 382/103 |
| 2013/0016251 A1 | 1/2013 | Ogasahara | |
| 2013/0057713 A1 | 3/2013 | Khawand | |
| 2013/0208138 A1 | 8/2013 | Li et al. | |
| 2013/0208143 A1 | 8/2013 | Chou et al. | |
| 2013/0271602 A1* | 10/2013 | Bentley | H04N 7/18 348/143 |
| 2013/0314511 A1 | 11/2013 | Chen et al. | |
| 2014/0009634 A1 | 1/2014 | Hiwada et al. | |
| 2014/0063300 A1 | 3/2014 | Lin et al. | |
| 2014/0074265 A1 | 3/2014 | Arginsky et al. | |
| 2014/0085495 A1 | 3/2014 | Almalki et al. | |
| 2014/0089401 A1 | 3/2014 | Filev et al. | |
| 2014/0160326 A1 | 6/2014 | Black | |
| 2014/0232929 A1 | 8/2014 | Ichikawa | |
| 2014/0244617 A1 | 8/2014 | Rose | |
| 2014/0358473 A1* | 12/2014 | Goel | A61B 5/1118 702/141 |
| 2015/0179223 A1 | 6/2015 | Leppanen et al. | |
| 2015/0195482 A1 | 7/2015 | Wise | |
| 2015/0271405 A1 | 9/2015 | Lameer et al. | |
| 2015/0288869 A1 | 10/2015 | Furuhashi | |
| 2015/0318020 A1 | 11/2015 | Pribula | |
| 2015/0341546 A1 | 11/2015 | Petrescu et al. | |
| 2015/0341547 A1 | 11/2015 | Petrescu et al. | |
| 2015/0341548 A1 | 11/2015 | Petrescu et al. | |
| 2015/0341549 A1 | 11/2015 | Petrescu et al. | |
| 2015/0341550 A1 | 11/2015 | Lay | |
| 2015/0341561 A1 | 11/2015 | Petrescu et al. | |
| 2016/0050354 A1 | 2/2016 | Musatenko et al. | |
| 2016/0080626 A1 | 3/2016 | Kovtun et al. | |

FOREIGN PATENT DOCUMENTS

| | | |
|---|---|---|
| EP | 2852147 | 3/2015 |
| KR | 20070005947 | 1/2007 |
| WO | WO 2005099251 | 10/2005 |
| WO | WO-2007128114 | 11/2007 |
| WO | WO-2010068175 | 6/2010 |
| WO | WO-2012166044 | 12/2012 |
| WO | WO-2013172335 | 11/2013 |

OTHER PUBLICATIONS

"Final Office Action", U.S. Appl. No. 11/931,828, Jan. 14, 2014, 14 pages.

"Final Office Action", U.S. Appl. No. 11/931,828, May 13, 2010, 17 pages.

"Final Office Action", U.S. Appl. No. 11/931,828, Jun. 11, 2015, 16 pages.

"Final Office Action", U.S. Appl. No. 13/468,098, Sep. 18, 2015, 16 pages.

"International Preliminary Report on Patentability", Application No. PCT/US2013/040347, Nov. 20, 2014, 6 pages.

"International Search Report and Written Opinion", Application No. PCT/US2015/018869, May 20, 2015, 10 pages.

"International Search Report and Written Opinion", Application No. PCT/US2013/040437, Jul. 23, 2013, 9 pages.

"International Search Report and Written Opinion", Application No. PCT/US2015/023238, Jun. 22, 2015, 11 pages.

"International Search Report and Written Opinion", Application No. PCT/US2015/023250, Jun. 22, 2015, 12 pages.

"International Search Report and Written Opinion", Application No. PCT/US2015/023241, Jun. 23, 2015, 12 pages.

"New BLINK Apps Even More Creative", Retrieved from: http://research.microsoft.com/en-us/news/features/blink-061813.aspx, Jun. 18, 2013, 4 pages.

"Non-Final Office Action", U.S. Appl. No. 11/931,828, Jul. 12, 2013, 21 pages.

"Non-Final Office Action", U.S. Appl. No. 11/931,828, Oct. 7, 2015, 22 pages.

"Non-Final Office Action", U.S. Appl. No. 11/931,828, Nov. 19, 2014, 20 pages.

"Non-Final Office Action", U.S. Appl. No. 11/931,828, Dec. 30, 2009, 14 pages.

"Non-Final Office Action", U.S. Appl. No. 13/468,098, Mar. 2, 2015, 14 pages.

"Non-Final Office Action", U.S. Appl. No. 14/218,194, Sep. 11, 2015, 7 pages.

"Non-Final Office Action", U.S. Appl. No. 14/450,573, Dec. 23, 2015, 10 pages.

"Non-Final Office Action", U.S. Appl. No. 14/457,374, Nov. 13, 2015, 12 pages.

"Non-Final Office Action", U.S. Appl. No. 14/487,785, Sep. 25, 2015, 8 pages.

"Powershot SX700HS Camera User Guide", Retrieved from the Internet: http://gdlp01.c-wss.com/gds/7/0300014407/02/PowerShot_SX700HS_Camer_User_Guide_EN.pdf, Mar. 29, 2014, 196 pages.

"Restriction Requirement", U.S. Appl. No. 14/450,390, Dec. 16, 2015, 6 pages.

"Restriction Requirement", U.S. Appl. No. 14/450,522, Dec. 24, 2015, 6 pages.

"Restriction Requirement", U.S. Appl. No. 14/450,553, Jan. 7, 2016, 6 pages.

"Restriction Requirement", U.S. Appl. No. 14/450,573, Sep. 1, 2015, 6 pages.

Dexter,"Multi-view Synchronization of Human Actions and Dynamic Scenes", In Proceedings British Machine Vision Conference, 2009, 11 pages.

Whitehead,"Temporal Synchronization of Video Sequences in Theory and in Practice", Proceedings of the IEEE Workshop on Motion Video Computing, 2005, 6 pages.

"Non-Final Office Action", U.S. Appl. No. 14/450,390, Apr. 8, 2016, 10 pages.

(56) References Cited

OTHER PUBLICATIONS

"Notice of Allowance", U.S. Appl. No. 13/468,098, Mar. 23, 2016, 8 pages.
"Notice of Allowance", U.S. Appl. No. 14/218,194, Feb. 26, 2016, 5 pages.
"Notice of Allowance", U.S. Appl. No. 14/457,374, Feb. 10, 2016, 15 pages.
"Notice of Allowance", U.S. Appl. No. 14/487,785, Feb. 1, 2016, 9 pages.
"Restriction Requirement", U.S. Appl. No. 14/450,461, Jan. 20, 2016, 6 pages.
"Corrected Notice of Allowance", U.S. Appl. No. 14/487,785, May 3, 2016, 4 pages.
"Final Office Action", U.S. Appl. No. 11/931,828, May 6, 2016, 23 pages.
"Final Office Action", U.S. Appl. No. 14/450,573, May 19, 2016, 12 pages.
"Non-Final Office Action", U.S. Appl. No. 14/450,461, May 6, 2016, 9 pages.
"Non-Final Office Action", U.S. Appl. No. 14/450,522, May 5, 2016, 13 pages.
"Non-Final Office Action", U.S. Appl. No. 14/450,553, May 31, 2016, 12 pages.
"Restriction Requirement", U.S. Appl. No. 14/450,492, Jun. 27, 2016, 6 pages.
"Supplemental Notice of Allowance", U.S. Appl. No. 14/218,194, May 3, 2016, 2 pages.

* cited by examiner

CAPTURING IMAGES OF ACTIVE SUBJECTS ACCORDING TO ACTIVITY PROFILES

BACKGROUND

As technology has advanced, the number and types of computing devices available has increased. This has resulted in users increasingly relying on their computing devices for various tasks including taking and sharing digital photographs using mobile devices that have built-in image capture functionality, such as mobile phones and tablets. For example, users may take self-images (colloquially "selfies") and share the images using various communication modalities (e.g., email, social networks, image sharing websites, etc.). It may be difficult, though, for users "on-the-go" to take and edit self-images particularly in relation to action shots of users engaged in activities such as playing sports, dancing, hiking, off-road driving, wake surfing, and so forth. Although some existing devices enable shutter delay features and burst modes to capture a succession of action shots via a remotely placed camera, a large number of images are captured using these techniques and there is little or no way for the user to control the image capture to select points in the action considered interesting over other less interesting points. As a result, the user may be forced to sort through and edit many images to find a satisfying action shot. Accordingly, image capture techniques available with some devices may fail to satisfy user expectations and may be inadequate for some use scenarios.

BRIEF DESCRIPTION OF THE DRAWINGS

Techniques and apparatuses enabling initiation of image capture via a wearable device are described with reference to the following drawings. The same numbers are used throughout the drawings to reference like features and components.

DETAILED DESCRIPTION

Techniques for capture of images of active subjects are described herein. For example, a user playing soccer, running, jumping rope, or engaged in some other active endeavor may wish to capture self-images (e.g., digital photographs, video clips, etc.) via an image capture device of the user's mobile phone or other computing device. To do so, the user may position the image capture device on a tripod or at another suitable location (e.g., on a table, rock, or other surface) and set-up the device to take images (e.g., position the lens and activate a capture mode). In accordance with techniques described herein the image capture device may be configured to communicate with a wearable device associated with the user, such as a smart watch, fitness band, clip-on pod, article of clothing, and so forth. Communication between the wearable device and the image capture device may be used to control timing of image capture by the image capture device, remotely and automatically.

For instance, the wearable device may be configured to use one or more sensors to collect information regarding action of the user during the activity that can be used to trigger the camera from some distance away. For example, motion sensors, an accelerometer, and others sensors may be used to monitor motion of the user and/or distinguish between different body movements such as jumps, kicks, running, squatting, etc. Thresholds established for different kinds of movement, characteristics of the movement, and for different activities may be used to define trigger points to control timing of image capture. For example, a kick velocity threshold may be establish for soccer, a height threshold may be set for jumping, and so forth. In one approach, activity profiles that specify the trigger points may be configured for different activities and different users. The activity profiles may then be used to recognize triggers based on observed action.

In operation, the wearable device is configured to collect data regarding action of a subject associated with the wearable device during an activity. In one or more implementations, a user may interact with the wearable device to identify or select the activity, type of movement, and/or a profile for image capture. The selected activity and profile determines the trigger points and capture techniques used to perform the image capture. For example, a proximity and movement technique may be set for an activity, such as running, that involves movement in and out of the camera frame. In addition or alternatively, up/down movement and a height threshold or velocity plateau may be employed for capturing a vertical jump at or near the peak. As another example, movement of a tennis racquet or other item and a velocity trigger of the movement may be defined for capturing associated action, such as hitting of a tennis ball with a stroke of the racquet.

The wearable device then communicates with the user's mobile phone or other computing device to trigger image capture in accordance with profiles and trigger points defined for the activity. This may involve streaming collected data for processing by the capturing computing device to recognize the triggers and/or sending indications of trigger points recognized by the wearable device. In the soccer example, the kick velocity threshold may be satisfied when the user takes a shot on goal. In this example, a wearable device (e.g., a band or a clip-on pod on the user's shoe) collects and communicates data indicative of the kick (e.g., raw data or trigger indications) to the capturing device, which may be set-up at a location apart from the wearable device overlooking the playing field. The information communicated by the wearable device enables the capturing device to recognize the kick velocity based trigger and capture an image of the kick. Further details regarding these and other aspects of techniques for capture of images of active subjects are provided in the following discussion.

Operating Environment

Figure 1:
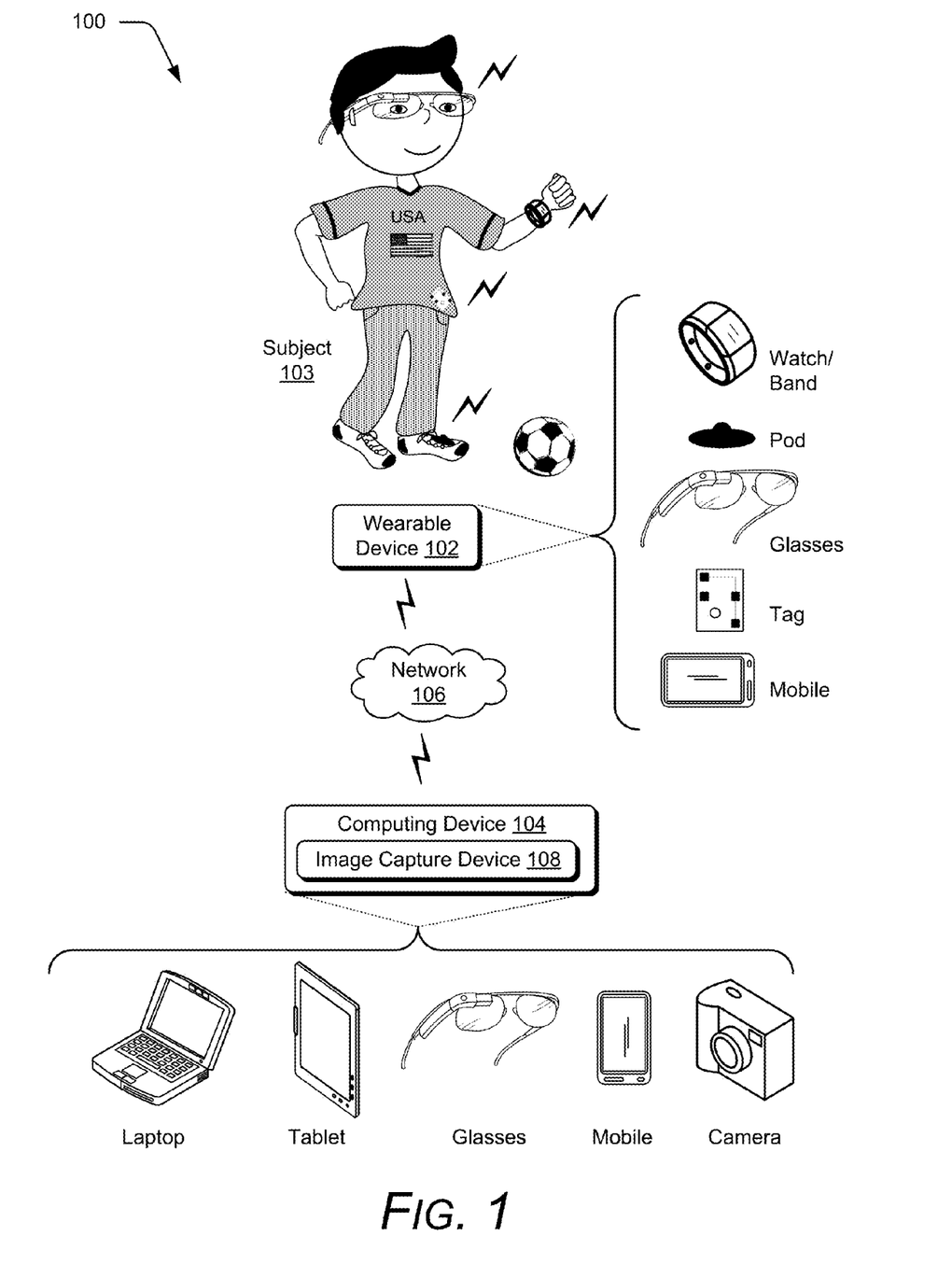
FIG. 1 illustrates an example environment in accordance with one or more implementations.

FIG. 1 illustrates an example environment 100 in which techniques to employ a wearable device to facilitate capturing of images of active subjects can be enabled. The example environment 100 includes a wearable device 102 (also referred to herein as "wearable") associated with a subject 103, and a computing device 104, which may be communicatively coupled via a communication network 106. Communication network 106 may include one or more wired or wireless networks, such as a local-area-network (LAN), a wireless local-area-network (WLAN), a personal-area-network (PAN), a wide-area-network (WAN), an intranet, the Internet, a peer-to-peer network, point-to-point network, a mesh network, and the like.

Typically, the computing device 104 is a portable device designed to be easily carried or transported (e.g., a laptop; a tablet computer; smart glasses; mobile devices such as a wireless phones, a game appliance, and a media player; a digital camera, etc.), although the computing device 104 can alternatively be a device intended to remain stationary during use (e.g., a desktop computer). The computing device 104 may be configured to include or make use of an image capture device 108 that is representative of functionality to capture images (e.g., digital images, video, etc.) and perform image processing operations. In one or more implementations, operation of the image capture device 108 including timing of capture is controlled at least in part based upon information regarding activity of the subject 103 that is collected via the wearable device 102 and conveyed to the image capture device 108 in some form to trigger image capture at designated trigger points.

For example, images of a user or other subject (e.g., an object or pet) "in-action" may be captured by a computing device 104 that is positioned to take the images based upon data collected via sensors associated with the wearable device 102. In other words, information regarding action of the subject that is measured using a wearable device 102 may be used to control timing of image capture by an image capture device 108 (e.g., determine when to take images).

As mentioned, activity profiles may be established for different activities, which may include global (e.g., default), activity-specific, and/or user-specific profiles. The profiles are configured to specify one or more trigger points for image capture during corresponding activities that are based on action(s) observed during the activity. In general, the trigger points establish threshold values for characteristics of action that are measured via various sensors while a subject is engaged in an activity. When one or a combination of the establish threshold values are satisfied, image capture is triggered. This may occur by setting up a capture mode for a particular activity and comparing data collected during the activity to a corresponding activity profiles to recognize the triggers. Activity profiles may be available for use by either or both of the wearable device 102 or computing device to recognize triggers, such as by storing the profiles on the devices. The activity profiles may be user configurable to set-up custom triggers for different activities. In this way, users may be given control over when images are taken during the activities, how many images are taken, the type/style of the images and other capture criteria reflected by the profiles. Users are also able to refine the trigger points to automatically take images at particular points of interest in the action (e.g., the top of a jump, after a kick, at top speed, etc.). As such, captured images are more likely to satisfy the users with little or no editing.

By way of example and not limitation, characteristics that may be measured via various sensors include motion/movement, location, height/altitude, acceleration, proximity, direction, particular body movements (e.g., kick, jump, punch, swing, skip, etc.), angles, position, distance, velocity, gestures, vital signs (heart rate, body temp, etc.), orientation, rotation, force, image shapes, and so forth. Sensors employed to measure the characteristics may include one or more of a light sensor, shape detector, accelerometer, gyroscope, thermometer, heart rate monitor, camera, microphone, compass, infrared sensor, gyroscope, and other suitable sensors. The threshold values established for the characteristics may be configured in various ways such as being a range of values, a maximum, a minimum, a percent or amount of change, a magnitude, a deviation, a time factor, a motion signature for defined gestures or body movements, and other thresholds. Additionally, different kinds of thresholds may be associated with different characteristics and/or corresponding sensors configured to measure the characteristics, as well as with different activities.

The wearable device 102 may be configured in ways. By way of example and not limitation, wearable devices may include: a watch or fitness band; a pod device such as a clip-on pod, foot pod, or fitness pod; a tag device that may be inserted into a pocket or be integrated with clothing items like hats, shoes, shirts, and pants; or even a mobile computing device (e.g., wireless phone) that is carried, placed in a pocket, inserted in an armband, etc. Further details regarding example components and operations of devices configured to implement the techniques described herein can be found in relation to the following figures.

Figure 2:
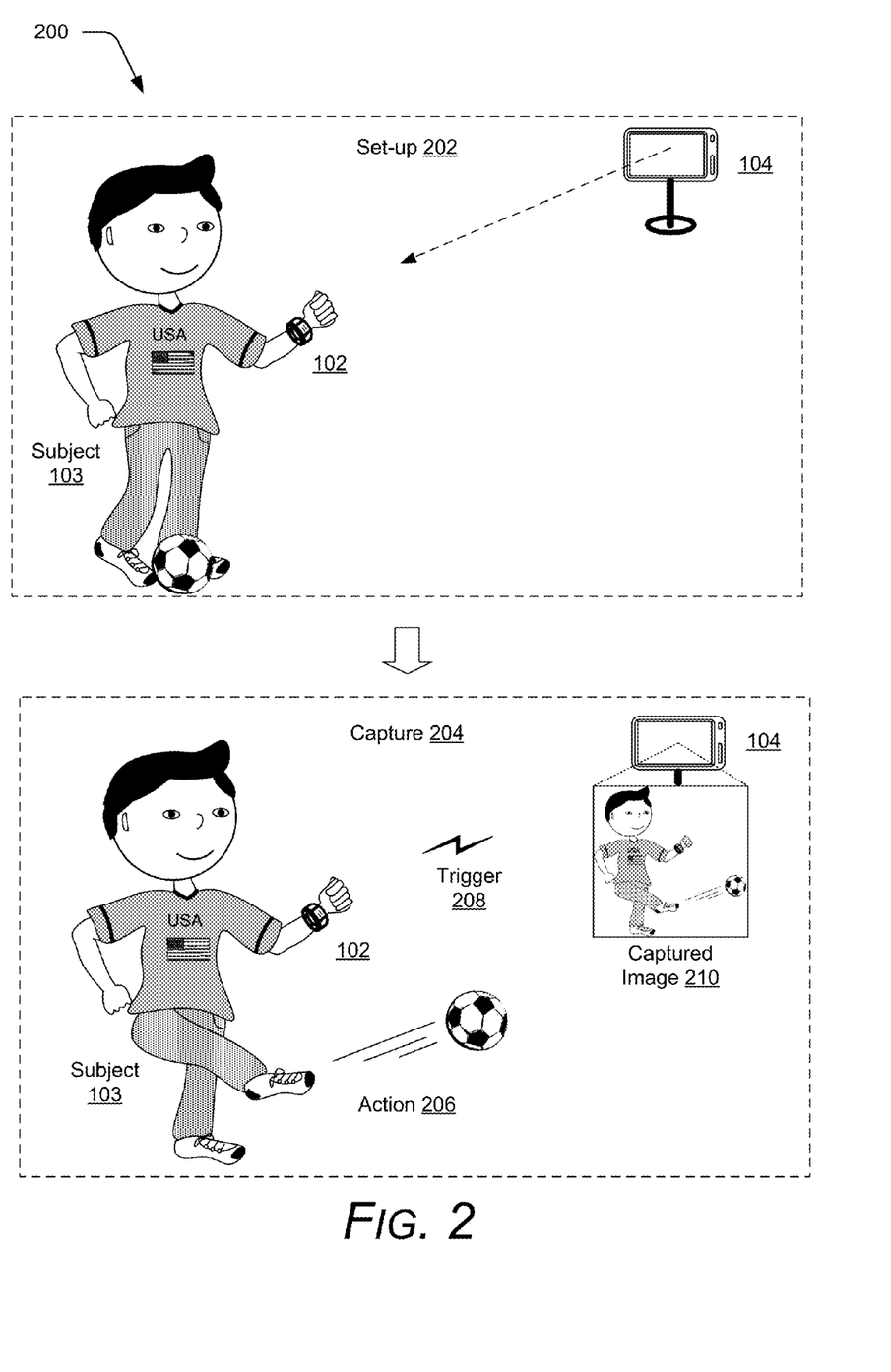
FIG. 2 illustrates an example scenario representing capture of an image of an active subject.

Having considered the example operating environment of FIG. 1, consider now FIG. 2 which depicts generally at 200 an example scenario representing capture of an image of an active subject. In this example, a subject 103 associated with a wearable device 102 is illustrated. In particular, an individual engaged in playing soccer is shown as wearing as smart watch or band on the individual's wrist. FIG. 2 represents set-up 202 of image capture and capture 204 of corresponding images during the soccer playing activity.

The set-up 202 may involve placing a computing device 104 having image capture functionality in a position to capture images, such as on a stand (as shown), on a tripod, on top of a post or other object, giving the device to another user to hold, and so forth. Set-up may also involve pairing of the wearable device 102 with the computing device 104 and establishing a communication connection. A capture mode of the computing device may also be activated. Further, set-up may include selecting a particular activity on the wearable device and/or computing device from among different available activities that may be associated with different activity profiles. In the illustrated example, "soccer" may be selected from among a list of available activities (e.g., default, running, biking, action shot, soccer), which configures the devices to use trigger points defined for soccer. It should be noted that although the computing device 104 may belong to the user having the wearable device 102, a user may also set-up another user's device to act as a capture device, such as set-up of a device belonging to a family member, friend, or colleague. Then, the other user's device may automatically take pictures and video in response to triggers generated via the wearable device 102.

As discussed above and below, the computing device 104 may be configured to recognize and respond to trigger points associated with activities. Information regarding user action used to identify the trigger points may be collected via the wearable device 102 and communicated to the computing device in some manner to initiate image capture. Accordingly, the capture 204 may involve detection and measuring of action 206 of the subject 103 during the activity, such as kicking the soccer ball as shown in FIG. 2. The wearable device 102 may stream raw data regarding the action 206 to the computing device 104 for processing to recognize a trigger 208, such as a motion threshold or kick velocity threshold established for the soccer activity. Alternatively, recognition of the trigger 208 may occur via processing performed by the wearable device 102, in which case an indication regarding the trigger is communicated to the computing device 104. In response to the information conveyed by the wearable device 102, the computing device 104 is configured to capture an image of the activity using associated image capture functionality. For instance, a captured image 210 of kicking the soccer ball is represented in FIG. 2 that may be captured responsive to recognition of the trigger 208 by the wearable device 102 or the computing device 104. The captured image 210 may be stored in memory and/or output for display on a display device of the computing device.

In an implementation, the computing device 104 may also be configured to selectively communicate the image or a version of the image back to the wearable device 102 for storage or display, depending upon display and storage capabilities of the wearable device 102. For example, the full image or a thumbnail/preview image may be sent back for display on a display device of the smart watch in the example of FIG. 2. The image may also be stored by the wearable device 102 depending upon image size, available storage capacity, and so forth. A version of the image to send back to a wearable may be configured to correspond to the wearable such that the image size and resolution are appropriate for the particular wearable. In the case of a wearable having limited capabilities, such as a pod or tag device, communication of the image back to wearable may be bypassed.

Example Devices

Figure 3:
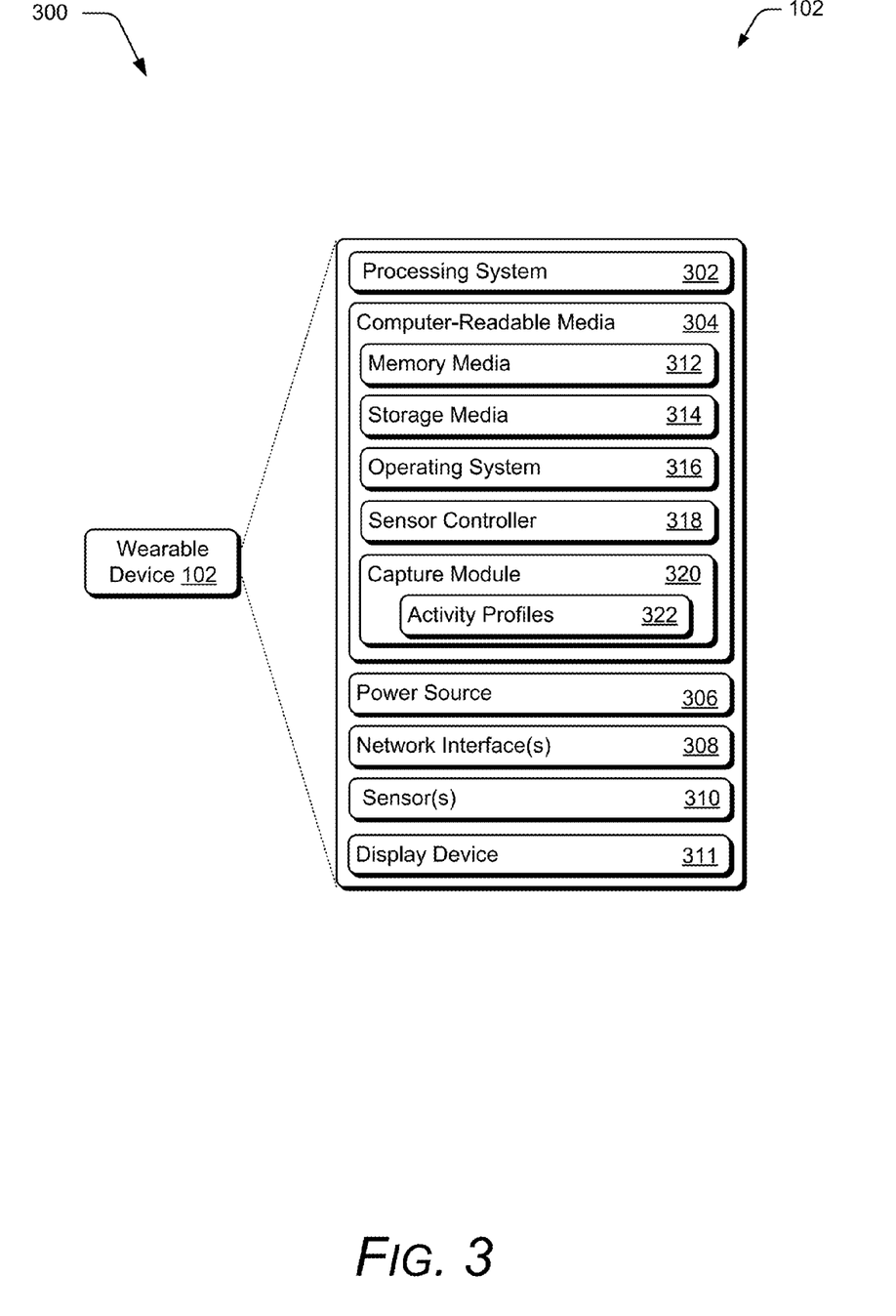
FIG. 3 illustrates a detailed example of the wearable device of FIG. 1.
Figure 4:
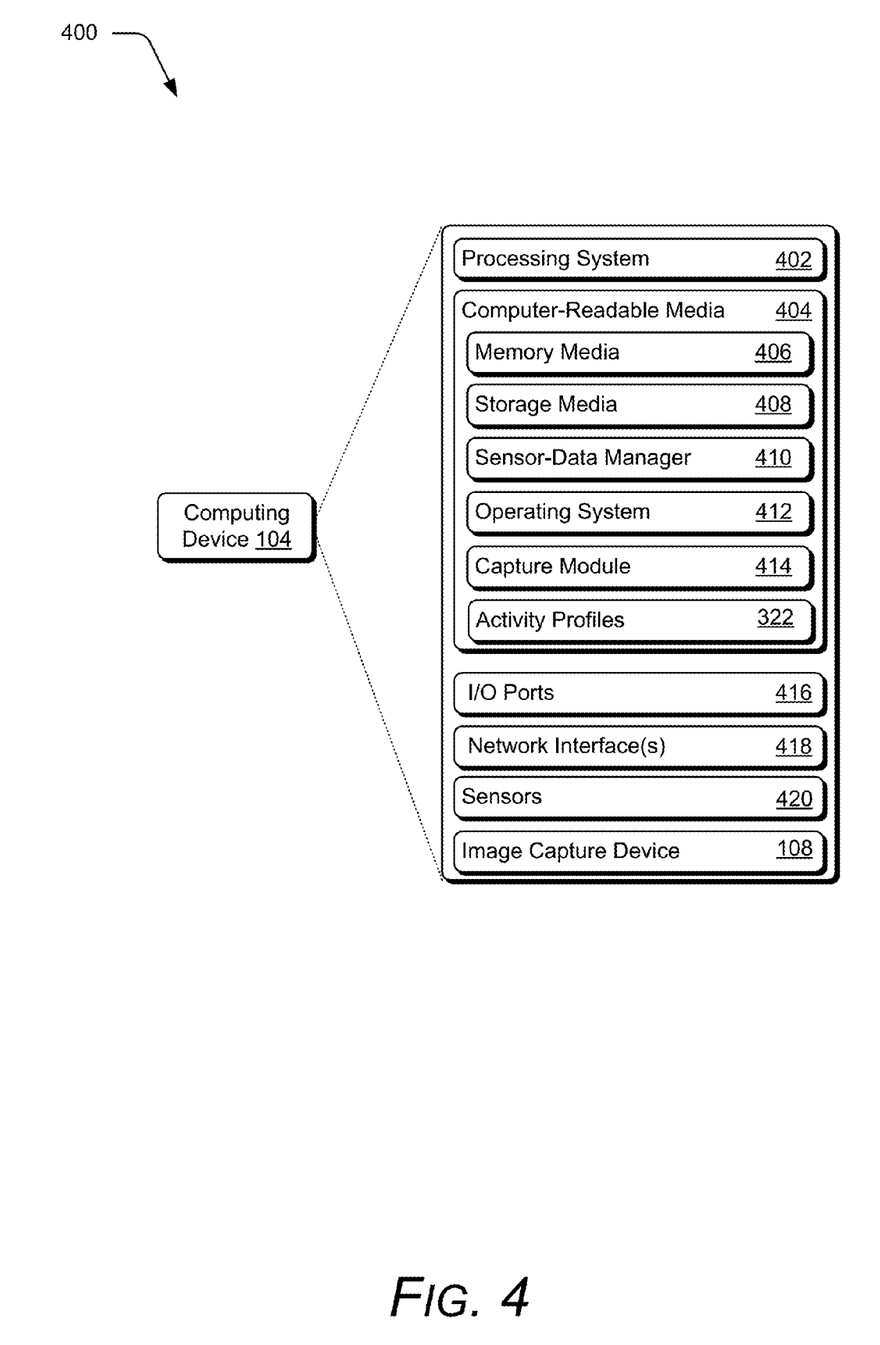
FIG. 4 illustrates a detailed example of the computing device of FIG. 1.

Before turning to example procedures related to capture of images of active subjects, details regarding example wearable devices 102 and computing devices 104 and components of these devices are discussed in relation to FIGS. 3 and 4, respectively. In particular, FIG. 3 depicts generally at 300 a diagram of an example wearable device 102 that may implement aspects of the image capture techniques described above and below. A variety of different types of wearable devices are contemplated, some examples of which were described in the preceding discussion. In the illustrated example, wearable device 102 includes a processing system 302, computer-readable media (CRM) 304, a power source 306, network interfaces 308, and one or more sensors 310 that may include different kinds of sensors used to measure characteristics of action during an activity as discussed herein. The network interfaces 308 are capable of communicating through various communication modalities or networks noted herein, and may include any combination of wireless or wired transmitters, receivers, or transceivers to enable these communications. The network interfaces 308 may facilitate pairing and communication with a computing device 104 that operates to capture images in the manner discussed herein.

Computer-readable media 304 may include memory media 312, storage media 314, an operating system 316, a sensor controller 318 employed to control and manage sensors 310, a capture module 320 that represents functionality of the wearable device to implement aspects of image capture techniques described herein, as well as other applications and program modules. Generally, applications and modules described herein may be embodied as computer-readable instructions which may be executed by a processing system to implement corresponding functionality. Functionality, features, and operations described in relation to various applications, modules, and components herein may be implemented in software, hardware, firmware, fixed device logic, on-chip systems, and combinations of these examples.

In relation to capturing of images of active subjects discussed herein, the sensor controller 318 represents functionality to enable operation of the sensors and measure action/movement of a subject, collect sensor data, analyze sensor data and performance, track subject, and/or provide sensor data that is collected to other components for processing. The capture module 320 may operate to obtain sensor data that is collected via the sensors and perform operations to cause capture of images based on trigger points that are indicated by the sensors. In one approach, the capture module 320 may operate to communicate raw sensor data for processing by another device/component to recognize the triggers. For instance, sensor data may be communicated via network interfaces to a remotely located computing device 104 (e.g., a device set-up to capture images) in communication with the wearable for processing at the computing device 104. In addition or alternatively, the capture module 320 may be configured to perform processing to recognize trigger points from the collected data at the wearable and then communicate indications of the trigger to the computing device 104. Recognition of the trigger points may involve comparison of the collected data to activity profiles 322 or other suitable data used to define various triggers.

FIG. 4 depicts generally at 400 a diagram of an example computing device 104 that may also implement aspects of the image capture techniques described above and below. The computing device 104 may include or alternatively be configured as an image capture device 108. Accordingly, the computing device 104 may be set-up to capture images of a subject in action using the principles described herein. A variety of different types of computing devices are contemplated, some examples of which were described in the preceding discussion.

In the illustrated example, computing device 104 additionally includes a processing system 402, computer-readable media 404, memory media 406, storage media 408, a sensor-data manager 410, an operating system 412, and a capture module 414 that represents functionality of the computing device to implement aspects of image capture techniques described herein, as well as other applications and program modules. Computing device 104 may further includes input/output ports 416 to obtain input and present information to a user, as well as networks interfaces(s) 418 that may be used to facilitate pairing and communication with a wearable device 102.

In some cases, computing device 104 may also include sensors 420, which may be used to measure and collect various information. By way of example and not limitation, sensors 420 may include one or more microphones, orientation sensors, accelerometers, cameras, and so forth. The sensor-data manager 410 is capable of recording, analyzing, tracking, and/or providing sensor data sensed by the sensors for use by other applications and components to control features and behaviors of the device.

Example Procedures

The following discussion describes example procedures by which techniques are implemented to enable control of an image capture device via a wearable device to capture images in response to established trigger points. The procedures may be implemented utilizing the previously described environment, system, devices, and components and in connection with any suitable hardware, software, firmware, or combination thereof. The procedures are shown as a set of blocks that specify operations performed by one or more devices and are not necessarily limited to the orders shown for performing the operations by the respective blocks. In at least some embodiments, the procedures may be implemented by way of suitably configured devices, such as by a wearable device 102 and/or computing device 104 that include or otherwise make use of respective capture modules 320, 414.

Functionality, features, and concepts described in relation to the examples in the preceding discussion may be employed in the context of the procedures described herein. Further, functionality, features, and concepts described in relation to different procedures below may be interchanged among the different procedures and are not limited to implementation in the context of an individual procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples.

Figure 5:
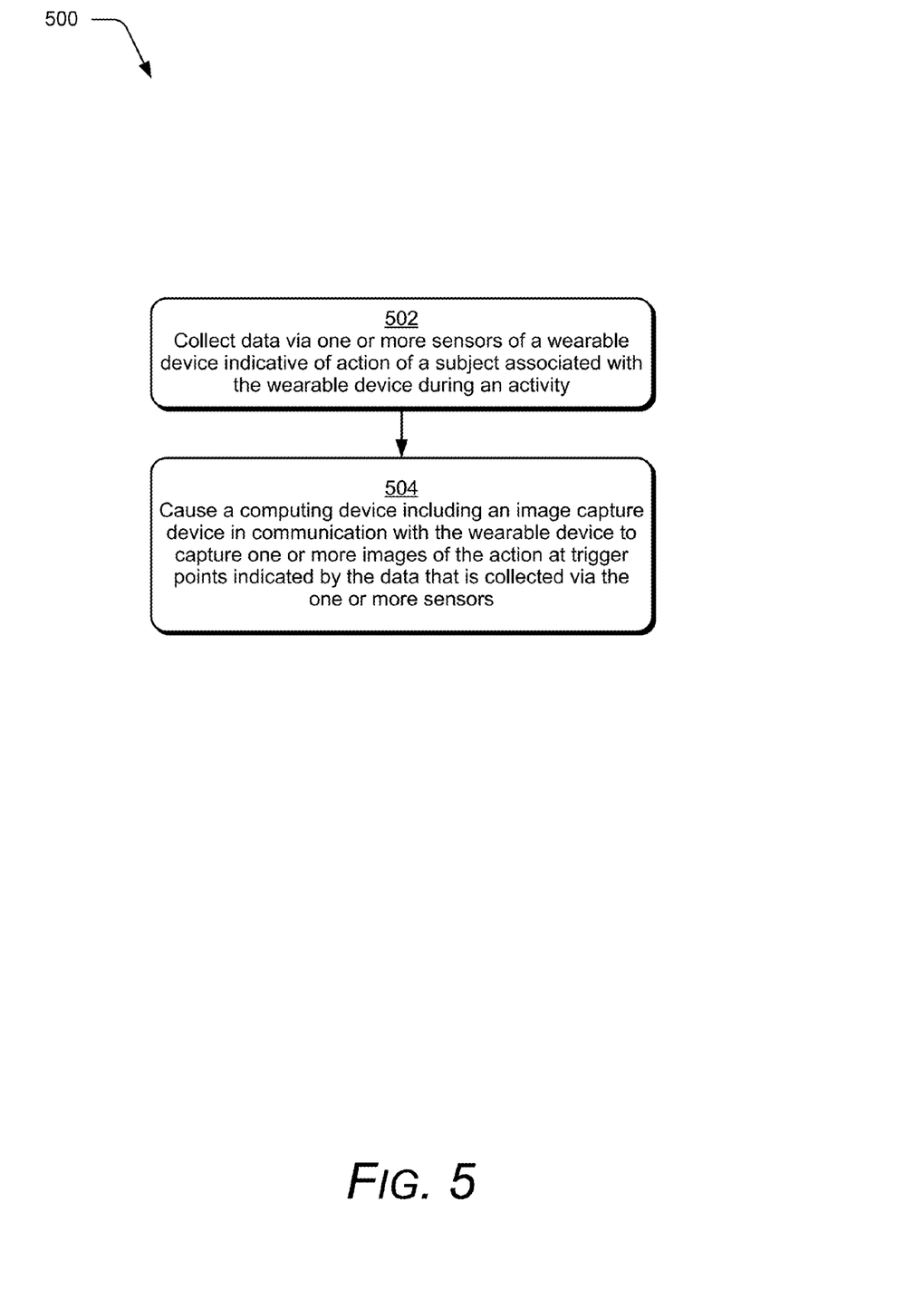
FIG. 5 illustrates an example procedure in which a wearable device triggers capture of images of a subject engaged in an activity.

FIG. 5 illustrates an example procedure 500 in which a wearable device triggers capture of images of a subject engaged in an activity. Data is collected via one or more sensors of a wearable device indicative of action of a subject associated with the wearable device during an activity (block 502). The wearable device 102 may be configured as a smart watch or band, or any other wearable device including the examples previously discussed. Data may be collected by the wearable device in various ways using one or a combination of sensors, examples of which have also been described in the preceding discussion. For instance, a sensor controller 318 may be used to manage an array of sensors associated with a wearable and obtain corresponding data regarding action of a user during activities. Thus, the collected data may include various kinds of data describing movement of the subject during the activity, proximity or position of the subject relative to the capture device, location of the subject, and so forth. Note that sensors may also obtain information about the user/subject such as heart rate and other vital signs and other physical attributes of a subject.

The sensor controller 318 may be configured to communicate or otherwise make the collected data available to applications and components for processing, including providing the data to a capture module 320 of the wearable device and/or streaming the data to another remote computing device 104 for recognition of image capture triggers. The wearable device then causes a computing device including an image capture device in communication with the wearable device to capture one or more images of the action at trigger points indicated by the data that is collected via the one or more sensors (block 504). For instance, data collected via the sensors may be provided to a capture module 320 of the wearable device as mentioned. The capture module 320 is configured to perform various operations to enable capture of images of active subjects. In particular, the capture module 320 may be invoked to initiate capture of images at trigger points indicated by the collected data. In order to do so, the capture module 320 may analyze the collected data at a wearable device 102 to recognize the trigger points and then communicate indications of the trigger points to initiate capture of corresponding images by the image capture device 108. As noted, trigger points may by recognized by comparing the data that is collected via the one or more sensors to an activity profile established for the activity that is configured to associate one or more characteristics of the action with trigger points for image capture during the activity. The trigger points may correspond to pre-defined values for the characteristics of the action achieved during engagement of the subject in the activity. Some example characteristics of the action that may be measured and used to define trigger points include but are not limited to motion, acceleration, vital signs and other physical attributes of the subject, speed, orientation, gestures, defined body movements, distance, and changes in position.

The image capture device 108 may be implemented by a computing device 104 that operates as a capture device, in which case communicating indications involves sending the indications to the computing device 104 via a communication network 106. The computing device 104 may be positioned at a location remote from the wearable device 102 to enable capture of the images of the subject associated with the wearable device during the activity. In addition or alternatively, causing the image capture device to capture the one or more images may be accomplished by streaming the collected data from the wearable device for analysis at the computing device to recognize the trigger points. However, the image capture device may also be implemented as a component of a wearable device, in which case sensor data and/or trigger indications may be communicated between components of the wearable device to cause the image capture.

Figure 6:
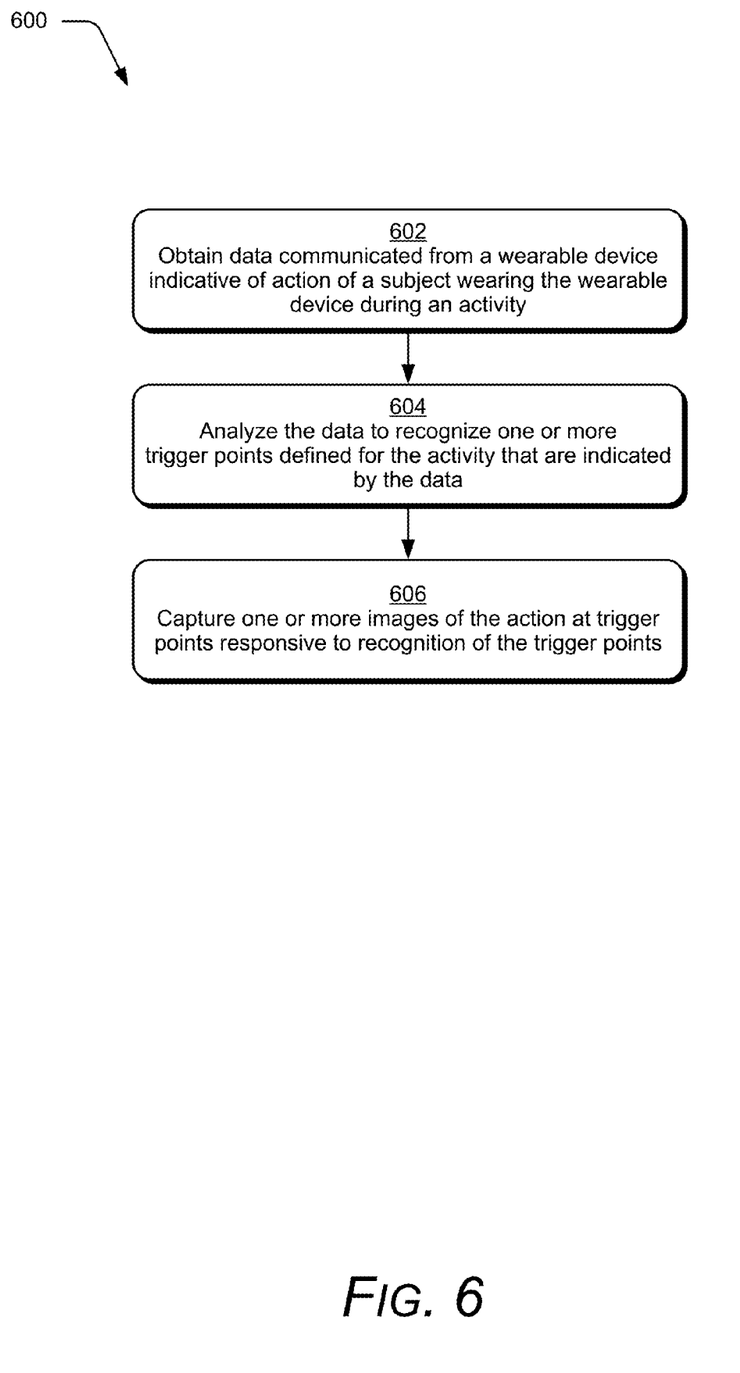
FIG. 6 illustrates an example procedure in which data obtained from a wearable device is used to capture images of a subject.

FIG. 6 illustrates an example procedure 600 in which data obtained from a wearable device is used to capture images of a subject. Data is obtained that is communicated from a wearable device indicative of action of a subject wearing the wearable device during an activity (block 602). Then, the data is analyzed to recognize one or more trigger points defined for the activity that are indicated by the data (block 604). For example, the data may be obtained via a sensor system of the wearable device in the manner discussed herein. The data may be received by a computing device 104 that is separate from the wearable device for processing via one or more network interfaces. In one example, analysis is performed by operation of a capture module 414 that is implemented as a component of the computing device 104. Again, the analysis may include comparing the data to an activity profile configured to set trigger points for the activity as values for characteristics of the action achieved during engagement of the subject in the activity. Then, one or more images of the action are captured at the trigger points responsive to recognition of the trigger points (block 606). For instance, the capture module 414 may control a shutter of an image capture device 108 to capture images according to timing dictated by the trigger points. Captured images may include digital photographs, videos and other kinds of images. The images may be stored by the computing device 104 and/or output to the display for viewing and/or editing by a user. As noted above, the capture module 414 may be configured to selectively communicate versions of captured images back to some wearable devices for preview and/or storage at the wearable device.

Example System and Devices

Figure 7:
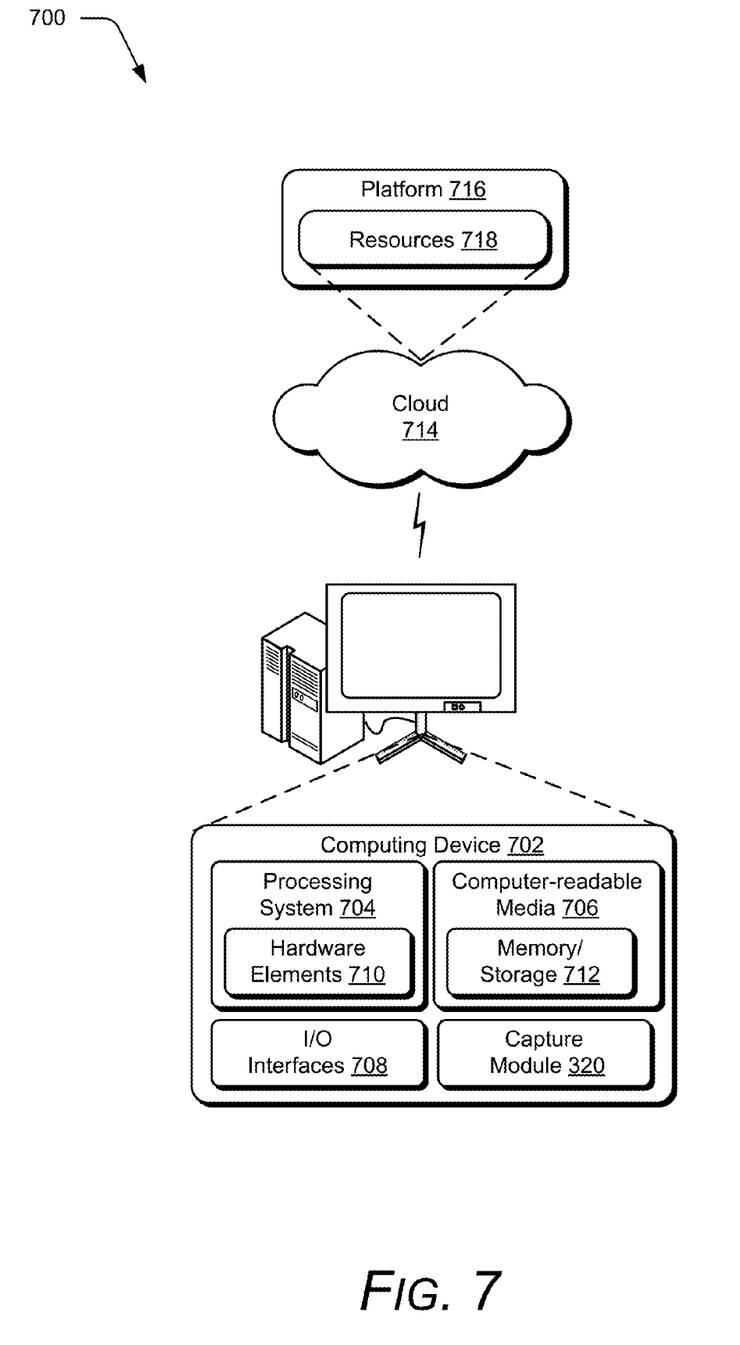
FIG. 7 illustrates an example system including various components of an example device that can be employed for one or more implementations described herein.

FIG. 7 illustrates an example system generally at 700 that includes an example computing device 702 that is representative of one or more computing systems and/or devices that may implement the various techniques described herein. This is illustrated through inclusion of the capture module 320, which operates as described above. Computing device 702 may also be configured to perform functionality associated with capture module 414 and other components discussed above. The computing device 702 may be, for example, a server of a service provider, a device associated with a client (e.g., a client device), an on-chip system, a wearable device 102, a computing device 104, and/or any other suitable computing device or computing system.

The example computing device 702 is illustrated as including a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although techniques have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter.

What is claimed is:

1. A computer-implemented method comprising:
defining an activity profile, the activity profile comprising trigger points for an activity, the trigger points being values for characteristics of action achieved during engagement in the activity;
collecting data via one or more sensors of a wearable device indicative of the action of a subject associated with the wearable device during the activity; and
causing a computing device including an image capture device in communication with the wearable device to capture one or more images of the action at the trigger points indicated by the data that is collected via the one or more sensors.

2. The computer-implemented method of claim 1, wherein causing the image capture device to capture the one or more images comprises streaming the collected data from the wearable device for analysis at the computing device to recognize the trigger points.

3. The computer-implemented method of claim 1, wherein causing the image capture device to capture the one or more images comprises analyzing the collected data at the wearable device to recognize the trigger points and communicating indications of the trigger points to the computing device to initiate capture of corresponding images by the image capture device.

4. The computer-implemented method of claim 1, wherein the trigger points are recognized by comparing the data that is collected via the one or more sensors to the activity profile established for the activity.

5. The computer-implemented method of claim 1, wherein the computing device is positioned at a location remote from the wearable device to enable capture of the images of the subject associated with the wearable device during the activity.

6. The computer-implemented method of claim 1, wherein the one or more sensors of the wearable device are configured to measure values for characteristics of the action including one or more of motion, acceleration, physical attributes of the subject, speed, orientation, gestures, defined body movements, distance, and changes in position.

7. The computer-implemented method of claim 1, wherein the image capturing device is implemented as a component of the wearable device.

8. The computer-implemented method of claim 1, wherein the collected data includes data regarding movement of the subject during the activity.

9. The computer-implemented method of claim 1, wherein the collected data includes data regarding proximity of the subject to the image capture device.

10. The computer-implemented method of claim 1, wherein capture of the one or more images includes capturing digital photographs.

11. The computer-implemented method of claim 1, wherein capture of the one or more images includes capturing a video clip.

12. The computer-implemented method of claim 1, the activity profile further comprising techniques used to perform the image capture.

13. The computer-implemented method of claim 1, the activity profile further comprising user-specific trigger points.

14. A wearable device comprising:
a processing system;
one or more sensors; and
one or more modules, that when executed by the processing system, cause the wearable device to perform operations to capture images of a subject engaged in an activity including:
obtaining data via the one or more sensors that is indicative of the action of the subject during the activity; and
communicating indications generated based on the obtained data to control timing of image capture by an image capture device in communication with the wearable device, the image capture device implemented by a computing device separate from the wearable device.

15. A wearable computing device as recited in claim 14, wherein the one or more modules further cause the wearable device to perform operations including:
recognizing trigger points at which operation of the image camera is triggered by comparing the obtained data to an activity profile established for the activity that is configured to associate characteristics of the action with the trigger points;
configuring the indications to convey the trigger points to the image capture device.

16. A wearable computing device as recited in claim 14, wherein another image capture device is integrated with the wearable device.

17. A computing device comprising:
a processing system;
an image processing device;
a network interface operable to establish a connection to a wearable device and exchange data with the wearable device; and
one or more computer-readable storage media having instructions stored thereon that, when executed by the processing system, implement a capture module configured to:
define an activity profile, the activity profile comprising trigger points for an activity, the trigger points being values for characteristics of action achieved during engagement in the activity;

obtain data through the network interface communicated from the wearable device indicative of the action of a subject associated with the wearable device during the activity;

analyze the data to recognize the trigger points defined for the activity that are indicated by the data; and capture one or more images of the action at trigger points responsive to recognition of the trigger points.

18. The computing device as recited in claim 17, wherein the capture module is further configured to capture the one or more images by controlling a shutter of the image capture device according to timing dictated by the trigger points.

19. The computing device as recited in claim 17, wherein the capture module is further configured to selectively communicate versions of the captured images back to the wearable device.

20. The computing device as recited in claim 17, the activity profile further comprising techniques used to perform the image capture.

* * * * *